United States Patent [19]

Hölter

[11] Patent Number: 5,165,600
[45] Date of Patent: Nov. 24, 1992

[54] VENTILATION SYSTEM FOR THE CAB OF A TRACTOR USED IN A SPRAYING SYSTEM

[76] Inventor: Heinz Hölter, Beisenstrasse 39-41, 4390 Gladbeck, Fed. Rep. of Germany

[21] Appl. No.: 805,533

[22] Filed: Dec. 11, 1991

[30] Foreign Application Priority Data
Dec. 17, 1990 [DE] Fed. Rep. of Germany ....... 4040340

[51] Int. Cl.⁵ .......................... B60H 3/06; B60H 3/02
[52] U.S. Cl. ........................................ 239/1; 239/148; 239/172; 239/159; 454/157; 454/158
[58] Field of Search .................... 239/1, 146, 148, 159, 239/172, 160-169; 261/DIG. 4; 55/73; 165/60, 19, 20; 454/157, 158

[56] References Cited
U.S. PATENT DOCUMENTS

| | | | |
|---|---|---|---|
| 3,472,147 | 10/1969 | Grasseler | 454/157 |
| 3,524,398 | 8/1970 | Winfrey | 454/157 |
| 3,834,680 | 9/1974 | Yost et al. | 454/158 |
| 3,868,896 | 3/1975 | Doll et al. | 454/158 |
| 4,048,911 | 9/1977 | Petersen | 454/158 |
| 4,052,006 | 10/1977 | Grass | 239/161 |
| 4,120,527 | 10/1978 | Lawrence | 454/158 |
| 4,140,047 | 2/1979 | Bowman et al. | 454/158 |
| 4,660,462 | 4/1987 | Thompson et al. | 454/158 |
| 4,784,048 | 11/1988 | Nelson | 454/158 |
| 4,834,249 | 5/1989 | Dahl | 239/172 |

FOREIGN PATENT DOCUMENTS 2121161 12/1983 United Kingdom .

Primary Examiner—Andres Kashnikow
Assistant Examiner—Karen B. Merritt
Attorney, Agent, or Firm—Herbert Dubno

[57] ABSTRACT

A method of and an apparatus for ventilating the cab of a tractor used for dispensing a plant-protective agent onto a plant site. A wet scrubber upstream of the cab in the ventilation system is continuously fed with fresh water while the continuously scrubbed water is collected and fed to the dispensing system as a result, the air entering the cab can be thoroughly cleaned without requiring expensive monitoring equipment.

5 Claims, 2 Drawing Sheets

VENTILATION SYSTEM FOR THE CAB OF A TRACTOR USED IN A SPRAYING SYSTEM

FIELD OF THE INVENTION

My present invention relates to a method of and an apparatus for treating a plant site with a plant-protective agent and, more particularly, to tractor-borne systems for dispensing a plant-protective agent over a plant site from a tractor having a cab or cabin in which the tractor operator is housed and which is ventilated. The invention relates specifically to the ventilation of this cab or cabin in such manner as to protect the operator for agent.

BACKGROUND OF THE INVENTION

It is common practice in agriculture to dispense plant protective agents onto plant sites using tractor-born equipment, such as sprayers or other dispensing apparatus The plant-protective agents which may be applied can include fertilizers, weed-suppressing herbicides, insecticides, fungicides, growth promoting or growth suppressing hormones, chemicals and biological agents, and the like.

Since such agents may be detrimental to the health of the operator, generally the ventilation system of the tractor cab was provided with a special filter in the hope of removing toxic or other potentially dangerous or noxious substances before the ventilating air reached the operator.

For the most part such filters were comprised mainly of active carbon or active coal.

However, the spectrum of plant-protective agents is so wide and the compositions which are dispensed onto the plant site and which may be entrained in the ventilating air are so diverse that frequently a single filter was unsatisfactory and could not insure complete removal of all of the detrimental substances. Of course, specially designed filters have not been fully developed for all plant-protective agents and are not always reliable. Furthermore, they may be very costly and may require constant monitoring.

Measuring devices for the continuous monitoring of such filters to insure that the activity of the filter will be substantial for all types of agents are expensive and technologically complex so that widespread use of such systems cannot be expected and is scarcely possible.

OBJECTS OF THE INVENTION

It is, therefore, the principal object of the present invention to overcome these disadvantages and provide an improved method of ventilating the tractor cab or cabin of a tractor used in the dispensing of plant-protective agents onto a plant site.

Another object of this invention is to provide an improved method of dispensing plant-protective agents from a tractor whereby better protection for the health of the operator can be afforded.

Still another object of this invention is to provide an improved apparatus or tractor system with better, safe and more reliable ventilation of operator cab, without the need for expensive, delicate and complex measuring equipment.

SUMMARY OF THE INVENTION

These objects and others which will become more readily apparent hereinafter are attained in accordance with the invention in a method whereby the ventilating air for the operator cabin is scrubbed in a wet air washer or scrubber, the water for the scrubber is continuously drawn as fresh water from a fresh water tank carried or drawn by the tractor, and the scrubbed water which is collected from the scrubber and may contain the plant-protective agent as contaminant, is supplied to the dispensing system for that agent. The scrubbed water, therefore, poses no problem to personnel and eventually reaches the ground or the plants as part of the solution of the plant-protective agent which is dispensed.

The fresh water can be supplied with additives promoting biological decomposition of matter entrained in the scrubbed water, to increase the efficiency of scrubbing of the air.

The wet scrubbed air can remain practically free from contaminants without regard to the specific plant-protective agents which are used and the systems does not require complex filters or complex monitoring equipment.

According to one aspect of the invention, therefore, a method of operating a tractor for dispensing a plant-protective agent comprises the steps of:

(a) drawing air from an ambient environment of the tractor;

(b) passing the air drawn from the ambient environment through an air scrubber into the cab, thereby ventilating the cab, and scrubbing air in the scrubber with water;

(c) supplying the water to the scrubber from a water tank carried by the tractor;

(d) recovering scrubber water, contaminated with the agent, from the scrubber; and (e) feeding the recovered scrubber water to a system carried by the tractor for dispensing the plant-protective agent.

In another aspect of the invention, an apparatus treating a crop site with a plant-protective agent can comprise:

a tractor adapted to travel across the crop site and provided with a cab receiving an operator of the tractor;

dispensing means on the tractor for dispersing a plant-protective agent across the site;

ventilating means for feeding air into the cab and including an air scrubber in which ventilating air is scrubbed with water;

a fresh-water tank on the tractor and provided with means for feeding fresh water to the scrubber for scrubbing air therewith to form scrubber water contaminated with the agent; and means for collecting the scrubber water and feeding the collected scrubber water to the dispensing means.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
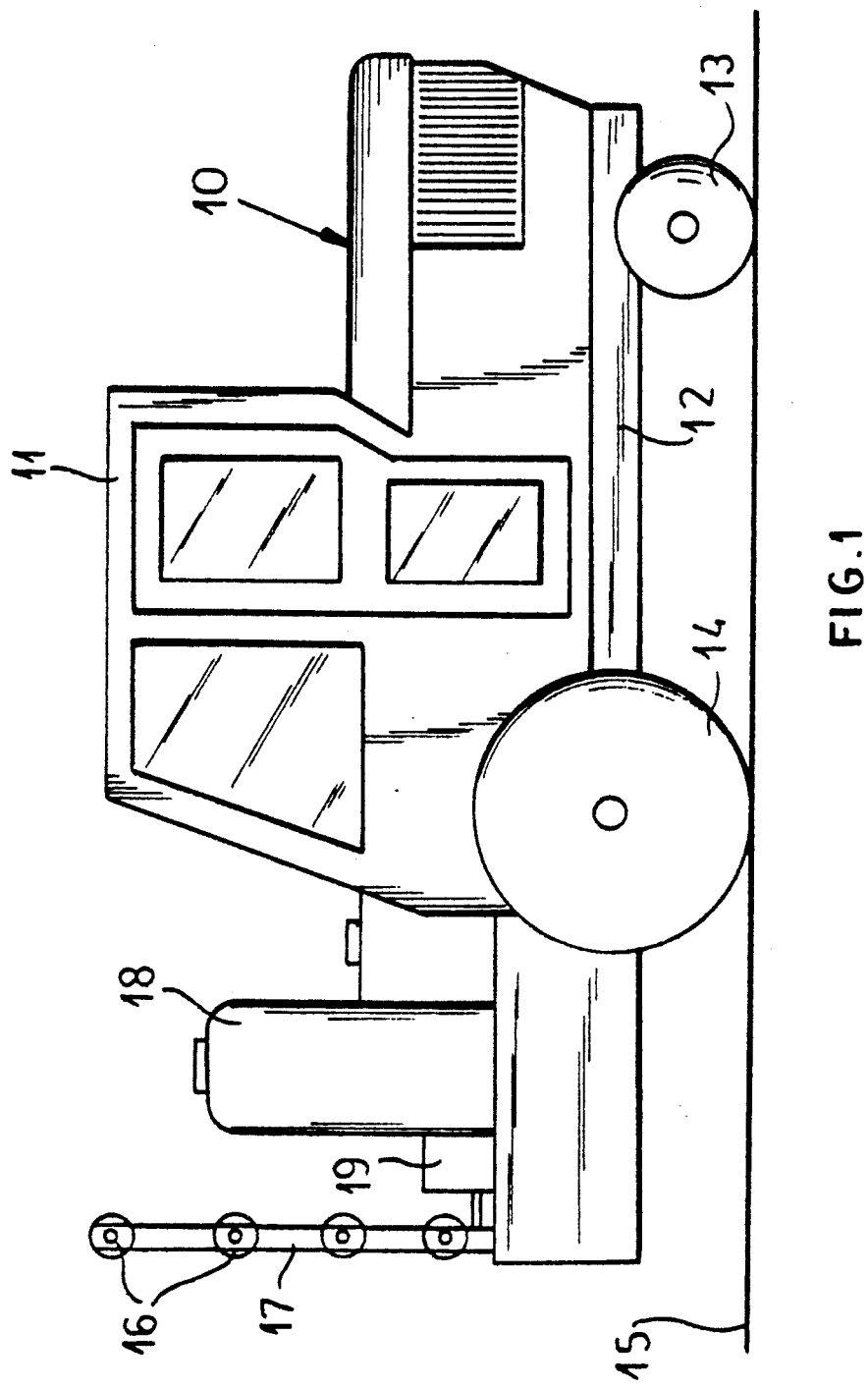
FIG. 1 is a side elevational view of a tractor system for spraying an aqueous solution or dispersion of a plant-protective agent onto a crop site according to the invention.

In the highly diagrammatic showing in FIG. 1 a tractor 10 having an operator cab 11 on a chassis or frame 12 with wheels 13 and 14, can travel across a plant site 15 to disperse a plant-protective agent e.g. from sprayer nozzles 16 on sprayer booms or beams 17.

The spray, usually of an aqueous solution dispersion or emulsion may be applied as a pre-emergent spray or as a post-emergent spray or as a spray applied to the leaves of an established crop.

Figure 2:
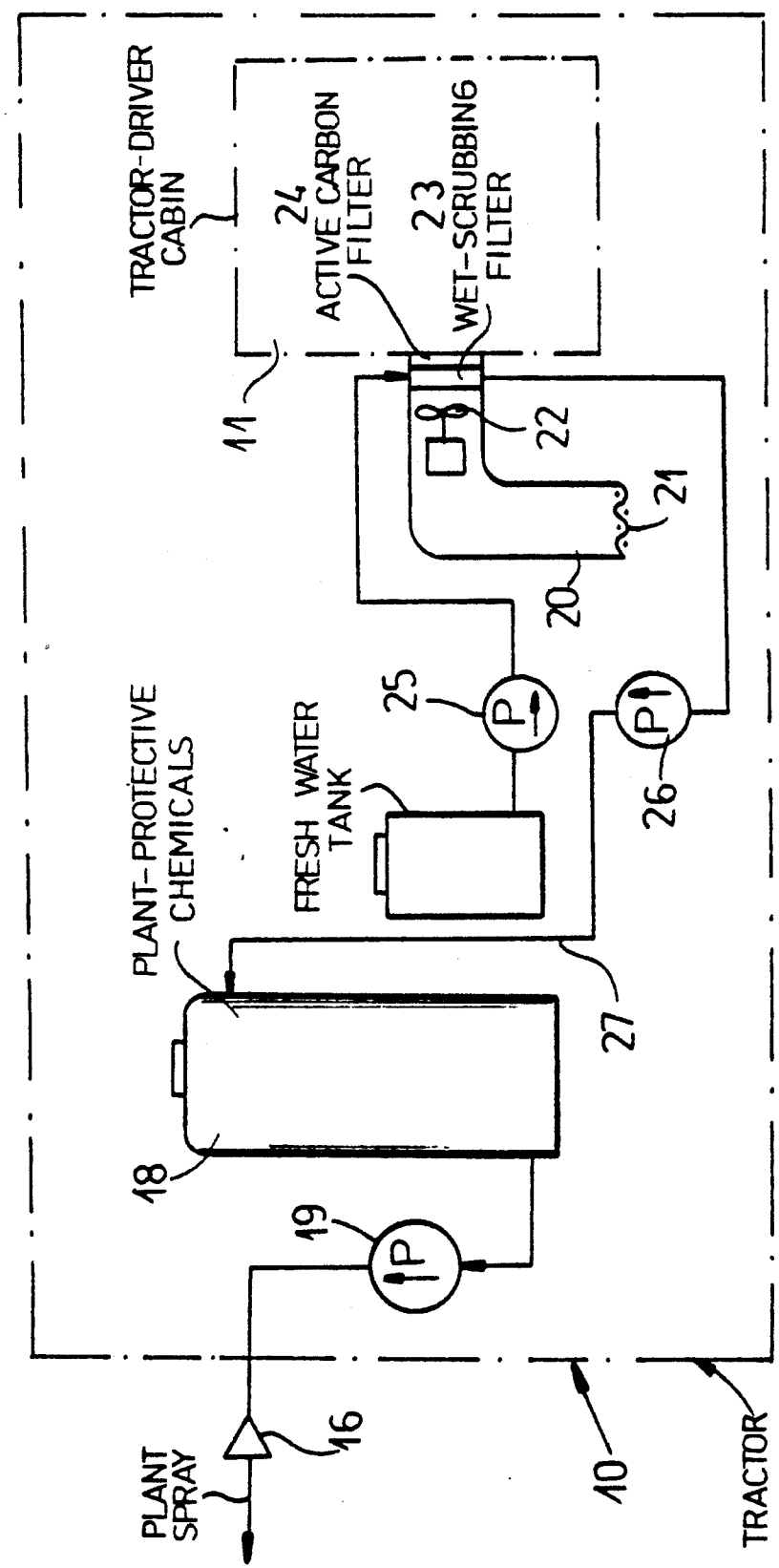
FIG. 2 is a diagram illustrating the various aspects of the system.

The spray system can comprise (see also FIG. 2) a reservoir 18 for the plant-protective chemicals and a sprayer pump 19.

According to the invention the operator cabin 11 is ventilated by a ventilating system represented by a duct 20 having a particulate-removal screen 21 at its intake, a blower or fan 22, a wet-scrubbing filter 23 or, if desired, an activated carbon filter 24 for processing the air before it enters the cabin 11.

The wet-scrubbing filter is fed continuously with scrubbed water from a fresh water tank by means represented as a pump 25 and the scrubbed water collected from the scrubber and containing possible contaminants is removed from the scrubber by a means represented as the pump 26 and fed at 27 to the dispensing system e.g. by introducing this water into the reservoir 18.

I claim:

1. A method of operating a tractor for dispensing a plant-protective agent and having a cab in which an operator of the tractor is located, said method comprising the steps of:

(a) drawing air from an ambient environment of said tractor;

(b) passing the air drawn from the ambient environment through an air scrubber into said cab, thereby ventilating said cab, and scrubbing air in said scrubber with water;

(c) supplying said water to said scrubber from a water tank carried by said tractor;

(d) recovering scrubber water, contaminated with said agent, from said scrubber; and (e) feeding the recovered scrubber water to a system carried by said tractor for dispensing said plant-protective agent.

2. The method defined in claim 1 wherein said system has a reservoir for said plant-protective agent, said recovered scrubber water being fed to said reservoir.

3. The method defined in claim 1, further comprising the step of introducing into said water at least one substance promoting biological decomposition of contaminants in said scrubber water.

4. An apparatus for treating a crop site with a plant-protective agent, comprising:

a tractor adapted to travel across said crop site and provided with a cab receiving an operator of said tractor;

dispensing means on said tractor for dispensing a plant-protective agent across said site;

ventilating means for feeding air into said cab and including an air scrubber in which ventilating air is scrubbed with water;

a fresh-water tank on said tractor and provided with means for feeding fresh water to said scrubber for scrubbing air therewith to form scrubber water contaminated with said agent; and means for collecting said scrubber water and feeding the collected scrubber water to said dispensing means.

5. In a method of ventilating an operator cab of a tractor for dispensing a plant-protective agent onto a plant site, the improvement which comprises the steps of:

(a) scrubbing air fed to said cab with water supplied from a fresh-water tank, thereby removing said agent from said air and forming a scrubber water contaminated with said agent; and (b) collecting said scrubber water and feeding the collected scrubber water to a system operating from said tractor and dispensing said agent onto said site.

* * * * *